United States Patent
Heidasch

(10) Patent No.: US 8,335,314 B2
(45) Date of Patent: Dec. 18, 2012

(54) ADAPTIVE AND SECURE MODULAR CONNECTION

(75) Inventor: Robert Heidasch, Speyer (DE)

(73) Assignee: SAP Aktiengesellschaft, Walldorf (DE)

( * ) Notice: Subject to any disclaimer, the term of this patent is extended or adjusted under 35 U.S.C. 154(b) by 273 days.

(21) Appl. No.: 12/844,253

(22) Filed: Jul. 27, 2010

(65) Prior Publication Data

US 2012/0027202 A1 Feb. 2, 2012

(51) Int. Cl.
*H04K 1/04* (2006.01)
*H04K 1/00* (2006.01)
*H04L 9/00* (2006.01)
*H04L 29/06* (2006.01)
*G07B 17/00* (2006.01)
*H04L 9/08* (2006.01)
*H04L 9/28* (2006.01)
*G06F 12/14* (2006.01)

(52) U.S. Cl. ............ 380/35; 380/28; 380/249; 380/277; 713/153

(58) Field of Classification Search .................. 380/35, 380/28, 277, 249; 713/153
See application file for complete search history.

(56) References Cited

U.S. PATENT DOCUMENTS

| 6,324,288 | B1 * | 11/2001 | Hoffman | 380/249 |
| 7,694,287 | B2 * | 4/2010 | Singh et al. | 717/143 |
| 7,774,402 | B2 * | 8/2010 | Singh et al. | 709/201 |
| 2008/0065878 | A1 * | 3/2008 | Hutson et al. | 713/153 |

FOREIGN PATENT DOCUMENTS

EP 859341 A2 * 8/1998

OTHER PUBLICATIONS

Rangan, C.K.A.; Jayanthi, J.; "A Generic Parser to parse and reconfigure XML files"; Recent Advances in Intelligent Computational Systems (RAICS), 2011 IEEE Digital Object Identifier: 10.1109/RAICS.2011.6069424 Publication Year: Apr. 2011 , pp. 823-827, IEEE Conference Publications.*

* cited by examiner

*Primary Examiner* — Andrew L Nalven
*Assistant Examiner* — Courtney Fields
(74) *Attorney, Agent, or Firm* — Blakely, Sokoloff, Taylor & Zafman LLP

(57) ABSTRACT

A method and system to increase the security of messages transmitted over an otherwise unsecured network. A secure channel is established in a normal manner over the network. A demodularization module on the sender sends a demodularization method to the intended receiver over the secure channel. The sender encodes a message definition and message data separately consistent with the demodularization method. The message definition and message key is sent over the secure channel as one transmission and the message data with the message key is sent as separate transmissions over the secure channel. Other embodiments are also described and claimed.

15 Claims, 3 Drawing Sheets

US 8,335,314 B2

ADAPTIVE AND SECURE MODULAR CONNECTION

FIELD

Embodiments relate to secure communication. More specifically, embodiments relate to secure communication between the sender and receiver in using an adaptive and secure modular connection.

BACKGROUND

Secure communications are critical to allow the exchange of confidential or otherwise sensitive information over an otherwise unsecured network, such as the Internet. Historically, messages have been exchanged using cryptography including symmetric encryption, asymmetric encryption, hybrid encryption, message authentication code, digital signatures, etc. However, particularly in a server-to-server environment where connection times may be measured in hours instead of seconds or minutes, sophisticated attacks can result in exposure of sensitive data.

In an application entitled "Modular Secure Data Transfer", Ser. No. 12/566,315, filed Sep. 24, 2009, invented by the inventor of the present application and assigned to the assignee of the present application, a method and system for modularizing data transfer such that the data of the message was separated from the metadata for the message and sent as separate transmissions over the network was proposed. Even in the context of this modularized messaging system where the message definition and message key are compromised, subsequent data transmissions will also be compromised. Moreover, modular secure transfer requires installation of the message modularizer and demodularizer on both the sender and the receiver. This means that all participants have to install software and then start to communicate. Changes to the modularizer/demodularizer require reinstallation or installation of an update on both participants. This results in significant administrative overhead and remains subject to sophisticated attack.

SUMMARY

A method and system to increase the security of messages transmitted over an otherwise unsecured network is disclosed. A secure channel is established in a normal manner over the network. A demodularization module on the sender sends a demodularization method to the intended receiver over the secure channel. The sender encodes a message definition and message data separately consistent with the demodularization method. The message definition and message key is sent over the secure channel as one transmission and the message data with the message key is sent as separate transmissions over the secure channel.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
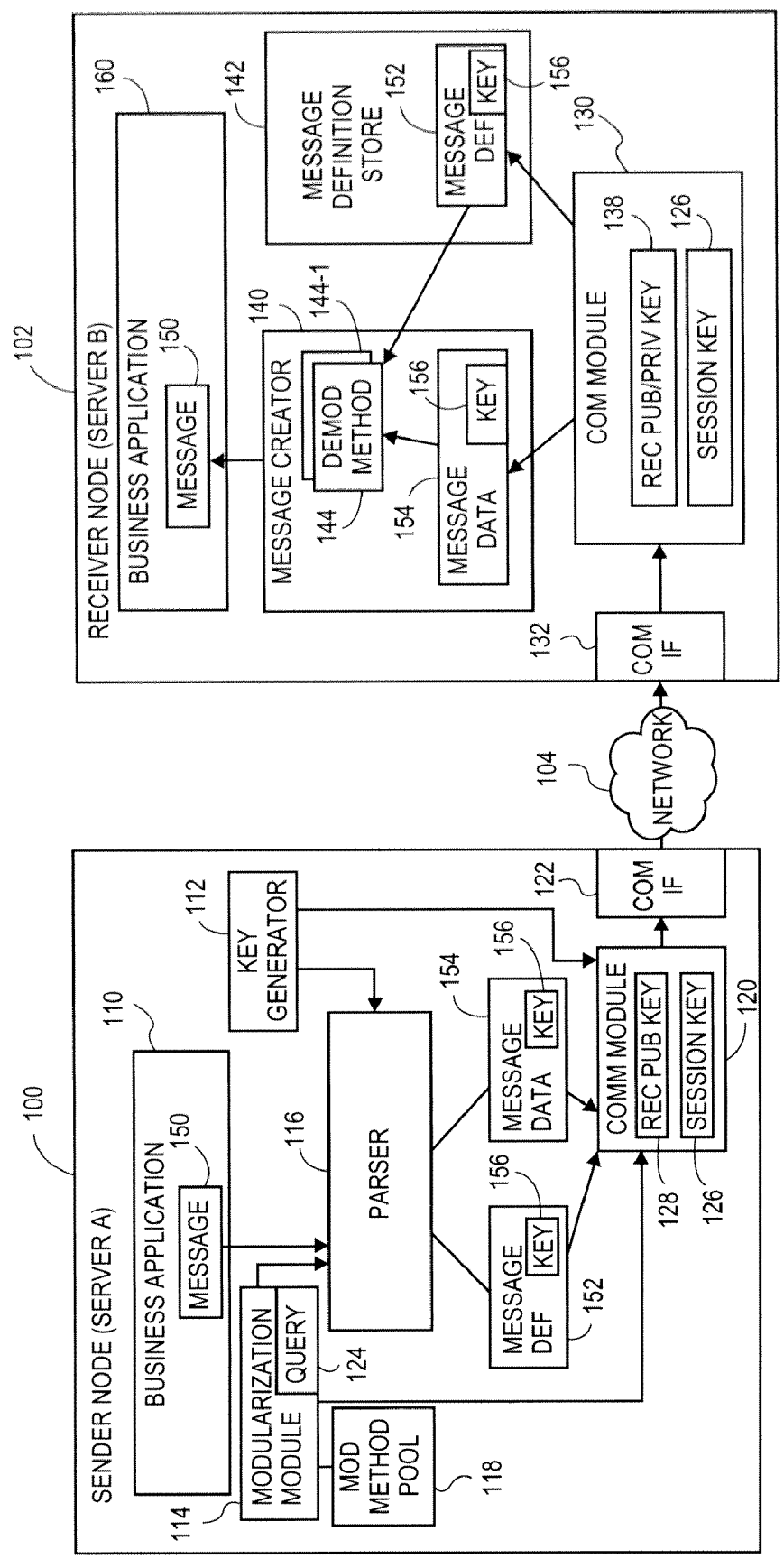
FIG. 1 is a block diagram of a system of one embodiment of the invention.

FIG. 1 is a block diagram of a system of one embodiment of the invention. A sender node 100 is coupled across a network 104 to a receiver node 102. It should be understood that a node may be a receiver in one session and a sender in another session. But as set forth below, within the session the sender provides the necessary tools for the improved secure communication without the need for administrative support or prior installation of the modularization/demodularization software on the receiver.

Sender node 100 may execute one or more business applications 110 which may desire to send a message, e.g. message 150 to receiver node 102. Communications module 120 within sender node 100 establishes a secure channel through communication interface 122 over network 104, through communication interface 132 to communication module 130 of receiver node 102. The secure channel may be established in the normal manner where the receiver has passed the sender its public key 128 prior to the session. The communication module 120 encrypts session key 126 with the public key 128 and sends it to the receiver 102 who is able to decrypt session key 126 using its corresponding private key 138. Session key 126 is then retained in communication module 130 to permit subsequent decryption of transmissions within the session. Typically "encryption" when used herein refers to any commonly known encryption technique including without limitation using symmetric encryption, asymmetric encryption, hybrid encryption, etc.

Once the secure channel is established, the query module 124 of modularization module 114 in sender node 100 queries the receiver node 102 about its runtime environment. Receiver node 102 responds with information about its runtime environment, which allows modularization module 114 to select a suitable modularization method from modularization pool 118. Sender node 100 then sends a demodularization method describing how the receiver node should use incoming data from the message to build the original message. The modularization method basically provides a recipe for transforming data to increase the difficulty of obtaining the original data without that recipe. The demodularization method 144 tells the receiver how to recover the original data. This transmission is signed with the session key 126 and may be encrypted.

In one embodiment, sending the initial demodularization method includes sending an implementation of message creator 140, message definition store 142, and an implementation of demodularization method 144. Because these implementations are sent at runtime and they are fully selfcontained, e.g. self-installing, administration on the receiver node such as prior installation of software components is avoided. As discussed below, this also permits changing of the demodularization method during the session. In one embodiment, once a particular demodularization method has been installed on a receiver during a session, it can be reused at a later time. For example, the sender may send a subsequent method, and later send instructions to switch methods to a previously installed method. In such case, the bandwidth of retransmitting the entire method is saved.

Key generator 112 is used to generate a message key, e.g. message key 156, which is passed to parser 116. The message key is unique to a particular message and session. Key generator 112 may generate the key as a random or pseudo-random string or use any other conventional method of key generation. Business application 110 sends message 150 to parser 116. Parser 116 decomposes message 150 to separate a message definition 152, for example, the metadata that describes how to interpret the message payload "data" from the message payload "data" itself. As explained in "Modular Secure Data Transfer", Ser. No. 12/566,315, filed Sep. 24, 2009, separating the metadata from the data increases security and reduces bandwidth on the channel as the message definition 152 need only be sent once, instead of with each data transmission. The separated message definition 152 is formatted consistent with the modularization method for which the demodularization method was passed to the receiver node along with the message key 156. The message definition 152 is encrypted and sent via communication interface 122 over the secure network channel to receiver node 102 by communications module 120.

Communications module 130 decrypts message definition and passes it to the implementation of message definition store 142 for retention. The separated message data 154 with message key 156 is then sent as a separate transmission via the communication interface 122 over the secure channel to receiver node 102.

When the communications module 130 receives message data 154 that a transmission is passed to message creator 140, which confirms the validity of key 156, message creator 140 then uses the message definition 152 from definition store 142 having a matching key 156 along with the demodularization method 144 to reconstruct the message 150 and pass it to business application 160.

As previously noted, a server-to-server communication session may last hours or in extreme cases the connection may be regarded as permanent. At any time during the session, modularization module 114 may select a new/replacement modularization method from modularization pool 118. The modularization pool 118 may have an arbitrarily large number of methods with multiple methods corresponding to each possible runtime environment with which sender node 100 expects to correspond. The new corresponding modularization method used by the parser 116 while the corresponding demodularization method 144-1 is passed to receiver node 102 along with a validity parameter which specifies how long message creator 140 should retain a prior demodularization method 144 as valid concurrently with the newly received demodularization method 144-1.

This is necessary because it cannot be assured that transmissions arrive at the receiver node 102 in the order they were sent from sender node 100. For example, it is possible that a change of the demodularization method may arrive at the receiver node prior to a previously transmitted message data transmission. If there were no ongoing validity of the preexisting demodularization method 144, this previously sent message data transmission would be discarded. The ability to change to modularization/demodularization method during the session increases security because if a prior demodularization method is compromised during the session, the new demodularization method would restore security.

Additionally, in some embodiments, key generator 112 may generate a new message key at any time during the session with all subsequent messages being encoded with that key. When a new key is generated, it too must be passed to the receiver node 102 with a validity parameter message data with the prior key arriving during the established ongoing validity time will be treated as valid but once the time for concurrent validity expires, subsequently arriving message data will be treated as invalid and discarded. This further enhances security by reducing the risk that a sophisticated attacker can substitute nefarious data in the event they are able to crack one message key. It is expected that the sender will generate new message keys relatively frequently to minimize the window during which a single cracked key may be of value.

Figure 2:
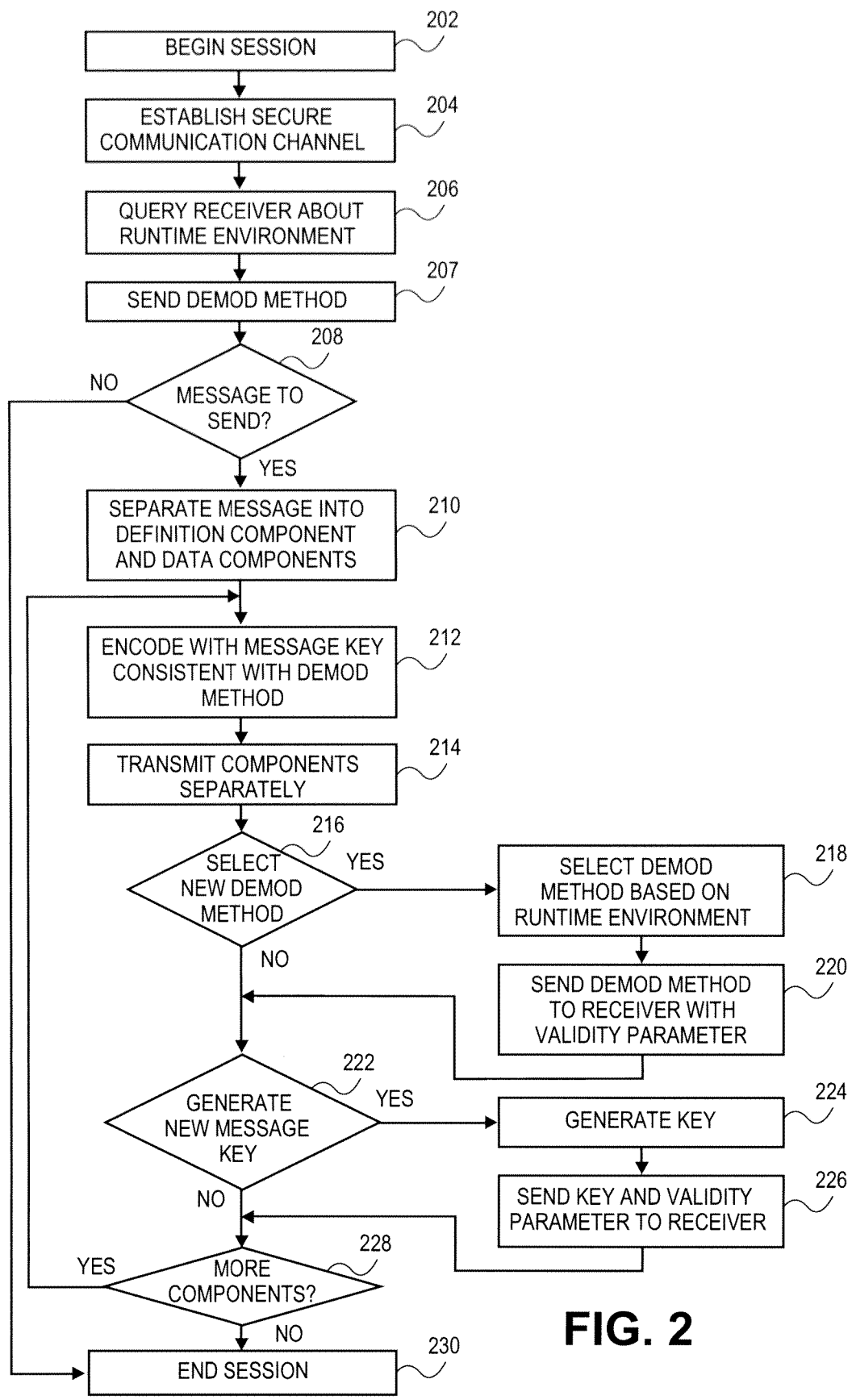
FIG. 2 is a flow diagram of operation on sender side, in one embodiment of the invention.

FIG. 2 is a flow diagram of operation on a sender side, in one embodiment of the invention. At block 202 the session begins. At block 204 a sender node establishes a secure communication channel with a receiver node. This can be done in the normal manner by requesting a public key, encrypting a session key with the pubic key, and passing it back to the receiver node. Once a secure channel is established the sender node queries the receiver node about its runtime environment at block 206. At block 207 a sender node selects and sends a demodularization method based on the runtime environment existing on the target receiver node. At block 208 an implicit decision is made if there is a message to send. If there is a message to send the message is separated into a definition component and data components at block 210. At block 212 the components are encoded with the message key and consistent with demodularization method. At block 214 the components are transmitted separately to the receiver node.

At decision block 216 determination is made whether to select a new demodularization method. If a new demodularization method is to be selected, such method is selected at block 218 based still on the runtime environment existing on the receiver node and at block 220 the new demodularization method is sent to the receiver with a validity parameter. At decision block 222 a determination is made whether to generate a new message key. If a new message key is to be generated, a new message key is generated at block 224. Then at block 226 the message key is sent with the validity parameter to the receiver. At block 228 a determination is made if additional components exist to be transmitted. If they do, they are encoded with the then existing message key and demodularization method as indicated in block 212 the session continues. If there are no more components to send then the session ends at block 230.

Figure 3:
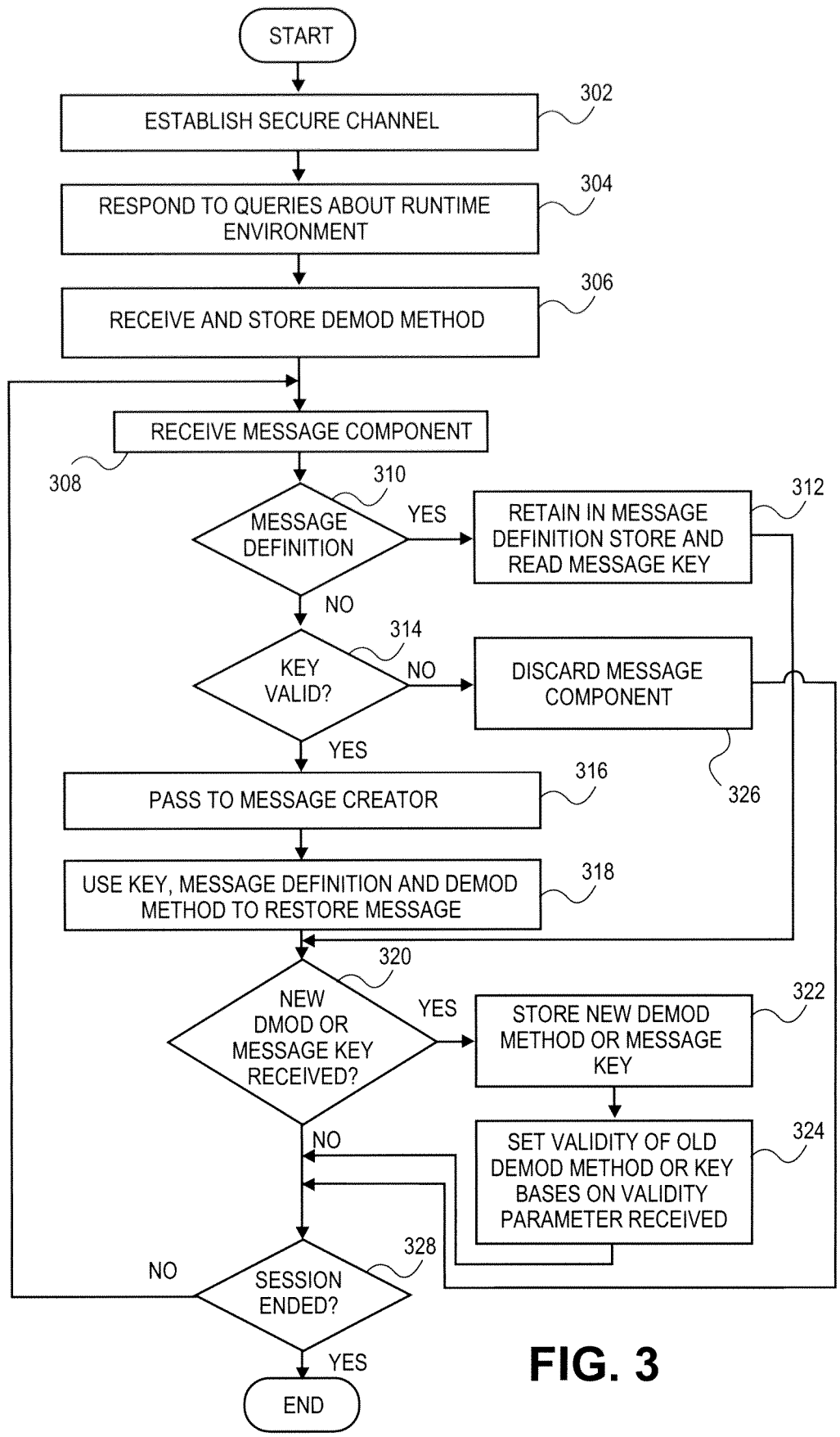
FIG. 3 is a flow diagram of operation on the receiver, in one embodiment of the invention.

FIG. 3 is a flow diagram of operation on the receiver, in one embodiment of the invention. At block 302 a secure channel is established with the sender. At block 304 the receiver responds to queries about its runtime environment. At block 306 the receiver node receives the demodularization method, which may include an implementation of a message creator and a message definition store. At block 308 the receiver receives a message component. A determination is made at block 310 if it is a message definition. If it is a message definition, the message definition is retained in the message definition store and the message key is read from the message definition at block 312. If it is not a message definition, a determination is made at block 314 whether its message key is valid. If the message key is not valid, the component is discarded at block 326. If the message key is valid, the component is passed to the message creator at block 316. At block 318, the key message definition and demodularization method are used to restore the message so that it can be passed to a target business application. At block 320 a determination is made if a new demodularization method or message key has been received. If a new demodularization method or message key has been received that new demodularization method would be retained in the message creator while the new message key is retained in the message definition store in association with the message definition previously received at block 322. Additionally, the transmission containing the new demodularization method or message key will contain a validity parameter for the old demodularization method or method key. At block 324 the validity of the old demodularization method or message key is set based on the received validity parameter. At block 328 a determination is made if the session has ended if not the receiver awaits additional components. If the session has ended, the secure communication channel is closed.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   establishing a secure communication channel between a sender and a receiver;
   transmitting, over the secure channel, a demodularization method from the sender to the receiver, the demodularization method to permit the receiver to rebuild a modularized message;
   encoding a message consistent with the demodularization method;
   sending a message definition including a message key to the receiver over the secure channel;
   sending message data with the message key over the secure channel to the receiver separately from the message definition.

2. The method of claim 1 further comprising sending a replacement message key to the receiver over the secure channel.

3. The method of claim 2 further comprising:
   specifying a validity overlap for the message key and the replacement message key.

4. The method of claim 1 further comprising:
   querying the receiver about a runtime environment of the receiver; and
   selecting the demodularization method based on the querying.

5. The method of claim 1 further comprising transmitting a replacement demodularization method from the sender to the receiver over the secure channel.

6. A system comprising:
   a sending node having a communication interface through which to establish a secure communication channel with a receiver node;
   a message modularization module within the sending node to provide a demodularization method to the receiver; and
   a parser within the sending node to separate a message definition and message data into separate transmissions both encoded with a message key and consistent with the demodularization method.

7. The system of claim 6 wherein the message modularization module can change the demodularization method during a communication session.

8. The system of claim 6 further comprising a key generator in the sending node to generate the message key and wherein the key generator can change the message key during a communication session.

9. The system of claim 8 wherein a message from the sending node to the receiver node changing of the key includes an attribute defining a time period during which both an old key and a new key are valid.

10. The system of claim 6 wherein the message modularization module comprises a query module to query the receiver node about a runtime environment on the receiver node and wherein a demodularization method is selected based on the runtime environment.

11. A non-transitory computer readable medium having instructions stored therein which when executed by a processor cause the processor to:
    establish a secure communication channel between a sender and a receiver;
    transmit, over the secure channel, a demodularization method from the sender to the receiver, the demodularization method to permit the receiver to rebuild a modularized message;
    encode a message consistent with the demodularization method;
    send a message definition including a message key to the receiver over the secure channel;
    send message data with the message key to the receiver over the secure channel separately from the message definition.

12. A computer readable medium of claim 11 having further instructions thereon that cause the processor to send a replacement message key to the receiver over the secure channel.

13. A computer readable medium of claim 12 having further instructions thereon that cause the processor to:
    specify a validity overlap for the message key and the replacement message key.

14. A computer readable medium of claim 11 having further instructions thereon that cause the processor to:
    query the receiver about a runtime environment of the receiver; and
    select the demodularization method based on the querying.

15. A computer readable medium of claim 11 having further instructions thereon that cause the processor to:
    transmit a replacement demodularization method from the sender to the receiver over the secure channel.

* * * * *